United States Patent
Winsvold et al.

(10) Patent No.: US 12,266,337 B2
(45) Date of Patent: Apr. 1, 2025

(54) NOISE MANAGEMENT DURING AN ONLINE CONFERENCE SESSION

(71) Applicant: Cisco Technology, Inc., San Jose, CA (US)

(72) Inventors: Bjørn Winsvold, Tranby (NO); Eric Yi-hua Chen, Irvine, CA (US); Wei-Lien Hsu, Austin, TX (US); Pi-Hsin Liu, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/770,037

(22) Filed: Jul. 11, 2024

(65) Prior Publication Data

US 2024/0363095 A1 Oct. 31, 2024

Related U.S. Application Data

(63) Continuation of application No. 18/303,001, filed on Apr. 19, 2023, now Pat. No. 12,039,966, which is a (Continued)

(51) Int. Cl.
*G10K 15/00* (2006.01)
*G06N 20/00* (2019.01)
(Continued)

(52) U.S. Cl.
CPC ....... *G10K 11/17885* (2018.01); *G06N 20/00* (2019.01); *H04L 12/1822* (2013.01)

(58) Field of Classification Search
CPC ...... E04B 1/8209; G06N 20/00; G06N 20/20; G10K 11/17854; G10K 11/17857;
(Continued)

(56) References Cited

U.S. PATENT DOCUMENTS 6,389,440 B1 * 5/2002 Lewis ................... H04M 9/082
381/71.11
7,120,259 B1 * 10/2006 Ballantyne ............. H04B 3/493
381/71.11
(Continued)

FOREIGN PATENT DOCUMENTS

JP 2009258292 A 11/2009

OTHER PUBLICATIONS

Baghdasaryan D., "Real-Time Noise Suppression Using Deep Learning," NVIDIA Developer Blog, Oct. 31, 2018, 12 Pages.
(Continued)

*Primary Examiner* — Gerald Gauthier
(74) *Attorney, Agent, or Firm* — Edell, Shapiro & Finnan, LLC

(57) ABSTRACT

Managing noise during an online conference session includes obtaining audio data from an endpoint participating in an online conference session. The audio data is derived from audio captured at the endpoint that includes musical sounds. The audio data is processed to identify a portion of the audio data in which a decibel level of the musical sounds is stable for a period of time. Non-musical noise present, if any, in the audio data with the musical sounds is identified and the non-musical noise is attenuated from the audio data to generate noise-reduced musical audio data. The noise-reduced musical audio data is transmitted for play out at one or more other endpoints participating in the online conference session.

17 Claims, 12 Drawing Sheets

Related U.S. Application Data continuation of application No. 16/993,908, filed on Aug. 14, 2020, now Pat. No. 11,688,384.

(51) Int. Cl.
*G10K 11/178* (2006.01)
*H04L 12/18* (2006.01)

(58) Field of Classification Search
CPC .. G10K 11/17885; G10K 15/00; G10L 19/24; G10L 21/02; G10L 21/0208; G10L 25/84; G10L 21/0364; H04B 3/493; H04L 12/1822; H04L 67/52; H04L 9/0838; H04L 12/1827; H04M 3/568; H04M 9/082; H04M 3/563; H04R 1/08; H04R 3/02; H04R 1/406; G06Q 10/10; H04N 7/15; H04N 7/152; H04S 7/302
See application file for complete search history.

(56) References Cited

U.S. PATENT DOCUMENTS

| | | | | |
|---|---|---|---|---|
| 7,155,018 B1* | 12/2006 | Stokes, III | ............ | H04M 9/082 379/406.01 |
| 8,126,706 B2 | 2/2012 | Ebenezer | | |
| 8,340,963 B2* | 12/2012 | Matsuo | ............ | H04R 3/02 704/226 |
| 8,462,193 B1* | 6/2013 | Truong | ............ | H04M 9/082 379/406.01 |
| 8,949,120 B1* | 2/2015 | Every | ............ | G10L 21/0208 704/226 |
| 9,008,329 B1* | 4/2015 | Mandel | ............ | G10K 15/00 704/226 |
| 9,094,645 B2 | 7/2015 | Kim et al. | | |
| 9,654,644 B2* | 5/2017 | Spittle | ............ | H04S 7/302 |
| 10,084,665 B1* | 9/2018 | Arunachalam | ............ | H04L 67/52 |
| 10,186,276 B2 | 1/2019 | Dewasurendra et al. | | |
| 10,446,170 B1* | 10/2019 | Chen | ............ | G06N 20/00 |
| 10,497,353 B2 | 12/2019 | Kulavik et al. | | |
| 11,688,384 B2* | 6/2023 | Winsvold | ............ | H04L 12/1827 381/71.11 |
| 11,929,085 B2* | 3/2024 | Biswas | ............ | G10L 19/24 |
| 12,039,966 B2* | 7/2024 | Winsvold | ............ | H04M 3/568 |
| 2008/0218586 A1* | 9/2008 | Graham | ............ | H04L 12/1822 348/14.09 |
| 2010/0142718 A1* | 6/2010 | Chin | ............ | G10K 11/17885 381/71.8 |
| 2010/0309284 A1* | 12/2010 | Samadani | ............ | H04N 7/15 348/E7.083 |
| 2011/0019810 A1* | 1/2011 | Alexandrov | ............ | H04L 12/1827 379/204.01 |
| 2011/0296506 A1* | 12/2011 | Caspi | ............ | H04L 9/0838 726/6 |
| 2012/0169835 A1* | 7/2012 | Woo | ............ | H04L 12/1827 348/14.09 |
| 2013/0006622 A1* | 1/2013 | Khalil | ............ | H04M 3/568 704/E11.001 |
| 2013/0077538 A1* | 3/2013 | Plotnikov | ............ | H04L 12/1827 370/260 |
| 2013/0136271 A1* | 5/2013 | Buck | ............ | G10L 21/0208 381/71.11 |
| 2014/0354761 A1* | 12/2014 | Graff | ............ | H04N 7/152 348/14.04 |
| 2015/0050967 A1* | 2/2015 | Bao | ............ | H04M 9/082 455/570 |
| 2015/0092615 A1* | 4/2015 | Frankel | ............ | H04M 3/563 370/260 |
| 2015/0195641 A1 | 7/2015 | Di Censo et al. | | |
| 2016/0125869 A1* | 5/2016 | Kulavik | ............ | G10K 11/17857 381/71.1 |
| 2017/0092288 A1* | 3/2017 | Dewasurendra | ............ | H04R 1/08 |
| 2017/0142522 A1* | 5/2017 | Hayashi | ............ | G10K 11/17875 |
| 2018/0176384 A1* | 6/2018 | Waugh | ............ | H04N 7/152 |
| 2019/0268387 A1* | 8/2019 | Pelton | ............ | G06Q 10/10 |
| 2020/0145753 A1* | 5/2020 | Rollow, IV | ............ | H04R 1/406 |
| 2020/0184991 A1 | 6/2020 | Cleve | | |
| 2020/0388297 A1* | 12/2020 | Rudberg | ............ | G10L 25/84 |
| 2021/0127204 A1* | 4/2021 | Porta | ............ | G06N 20/20 |
| 2021/0382678 A1* | 12/2021 | Back | ............ | H04M 3/568 |
| 2021/0383786 A1* | 12/2021 | Back | ............ | G10K 11/17854 |
| 2022/0031998 A1* | 2/2022 | Schnitta | ............ | E04B 1/8209 |
| 2022/0036907 A1* | 2/2022 | Liu | ............ | G10L 21/02 |
| 2022/0051652 A1* | 2/2022 | Winsvold | ............ | G10K 11/17885 |
| 2023/0252970 A1* | 8/2023 | Winsvold | ............ | G06N 20/00 381/71.11 |
| 2024/0147136 A1* | 5/2024 | Kulavik | ............ | H04R 1/1083 |

OTHER PUBLICATIONS

Hjerne J.D., "Zoom in Music Mode (NB! Changes Since the Release: Now You Can Enable Original Sound on Devices Too)," Mar. 16, 2020, Retrieved from URL: https://www.youtube.com/watch?v=50NoWIiYECA.

LeFave D.J., "Enable Original Sound Setting in Zoom to Enhance Music and Singing Sessions! Now Go Karaoke!!!," Mar. 31, 2020, Retrieved from URL: https://www.youtube.com/watch?v=tbMMsBW5Taw.

Polycom, Inc., "Polycom RealPresence Group Series", 6.1.5, Feb. 2018, 11 pages.

Polycom Whitepaper: "Music Performance and Instruction Over High-Speed Networks," Oct. 2011, 11 Pages.

Valin J.M., "A Hybrid DSP/Deep Learning Approach to Real-Time Full-Band Speech Enhancement," IEEE 20th International Workshop on Multimedia Signal Processing (MMSP), May 31, 2018, 5 Pages.

Valin J.M., "RNNoise: Learning Noise Suppression", Mozilla and Xiph, Sep. 27, 2017, 6 Pages.

Xu Y., et al., "IEEE/ACM Transactions on Audio, Speech and Language Processing," ACM Digital Library, Jan. 2015, 4 Pages.

Zoom Help Center: "Enabling Option to Preserve Original Sound," Retrieved from Internet Jun. 1, 2020, 2 Pages, Retrieved from URL: https://support.zoom.us/hc/en-us/articles/115003279466-Enabling-option-to-preserve-original-sound.

* cited by examiner

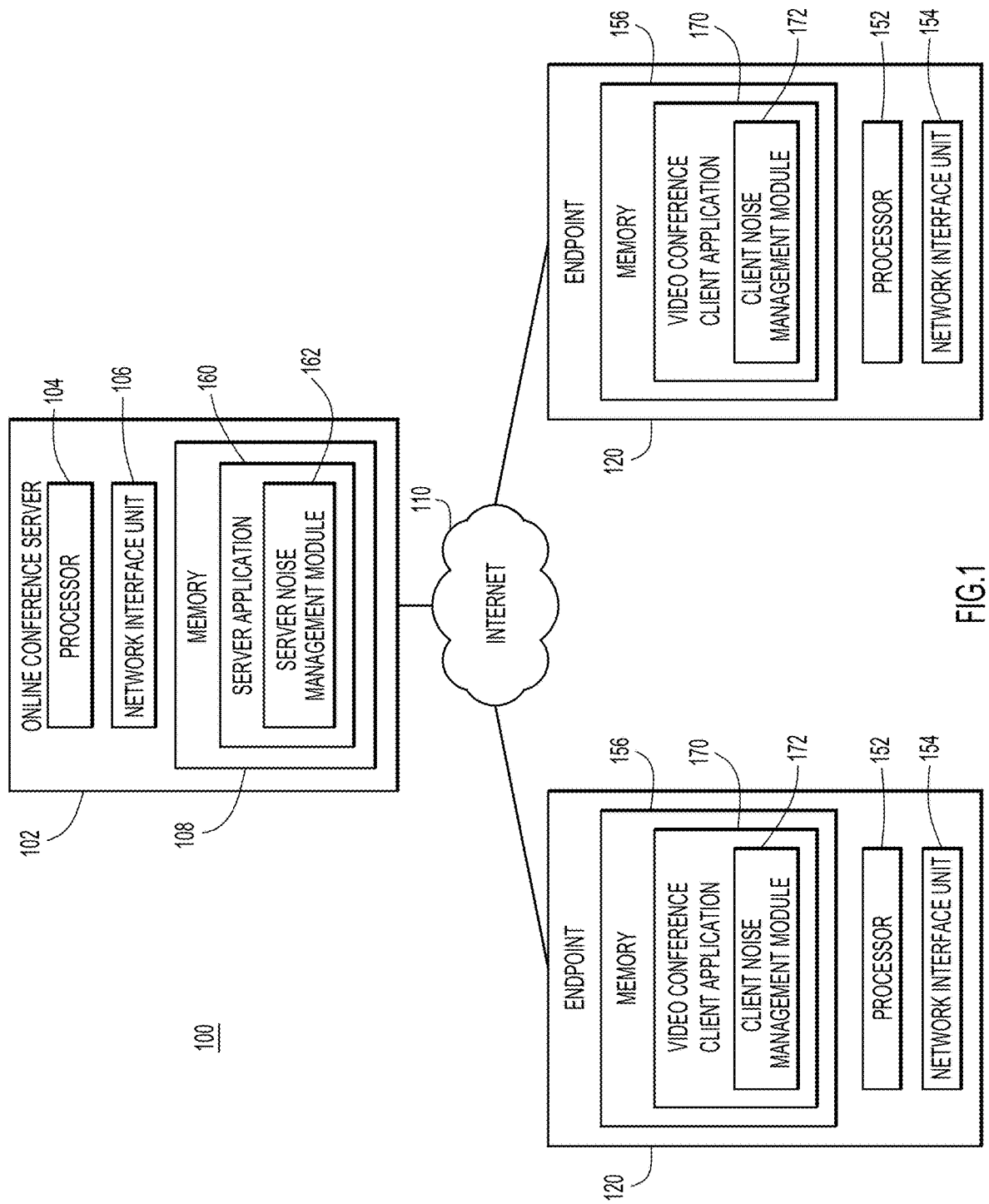

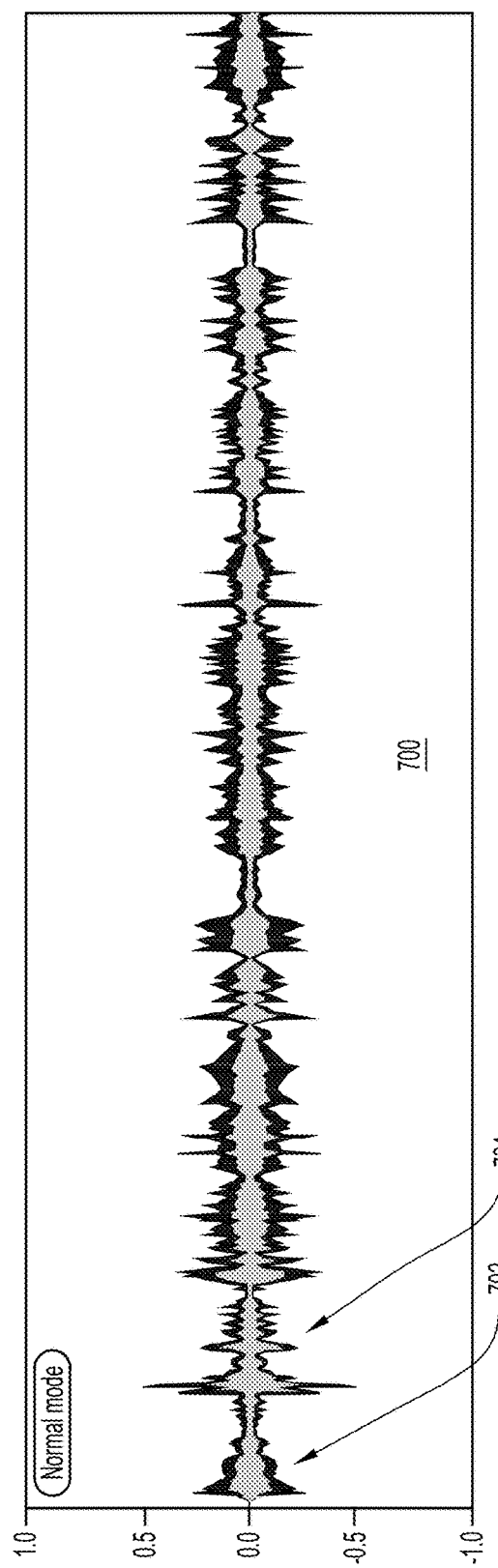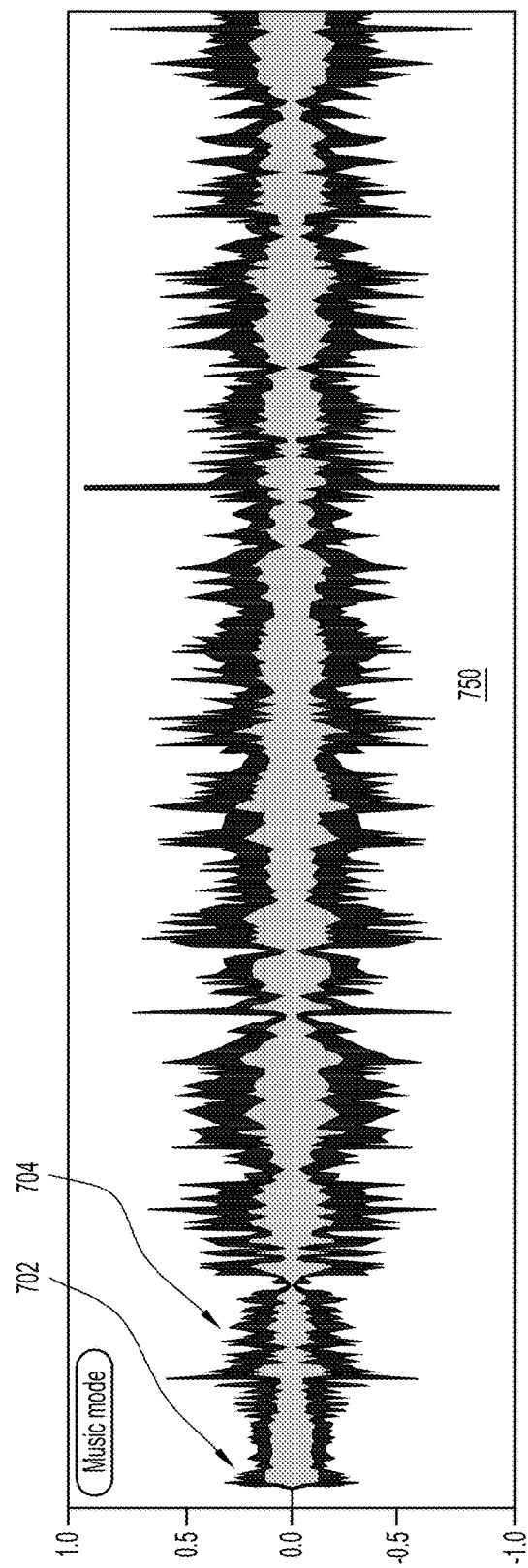

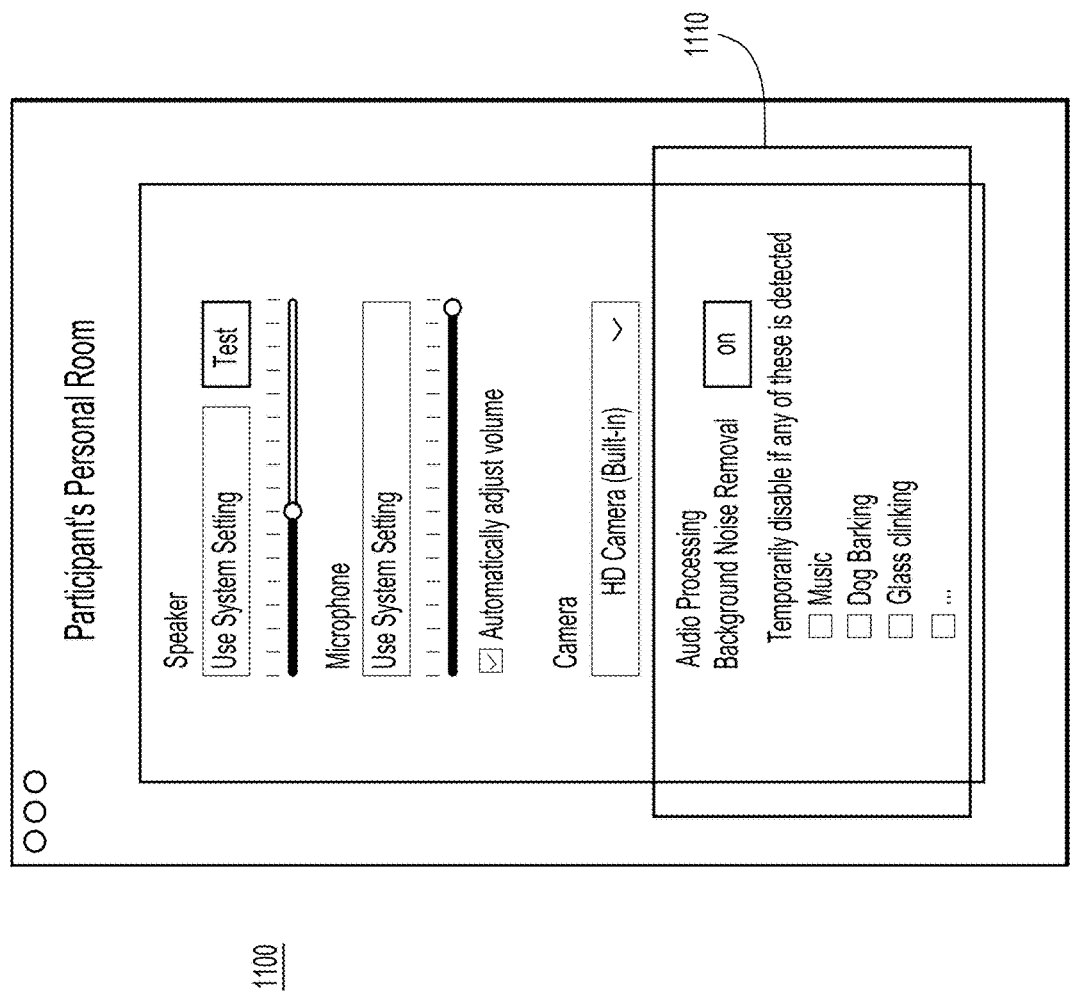

NOISE MANAGEMENT DURING AN ONLINE CONFERENCE SESSION

CROSS-REFERENCE TO RELATED APPLICATIONS

This application is a continuation of U.S. patent application Ser. No. 18/303,001, filed Apr. 19, 2023, now U.S. Pat. No. 12,039,966, which is a continuation of U.S. patent application Ser. No. 16/993,908, filed Aug. 14, 2020, now U.S. Pat. No. 11,688,384, which are hereby incorporated by reference in their entireties.

TECHNICAL FIELD

The present disclosure relates to collaboration systems and, more particularly, to online conference systems.

BACKGROUND

During a video conference session, not all "noises" are unwanted. This is especially true during certain periods, such as during a pandemic, when people use online conferencing, especially online video conferencing, for experiences that were typically in-person experiences. For example, music ensembles, happy hours, martial arts lessons, etc., shift online during a pandemic. In these unconventional online video conferences, sounds from musical instruments, wine glasses, punching bags, animals (e.g., dog barking), etc. may need to be preserved as part of the meeting experience. However, often, noise reduction algorithms employed by a conference system designed to preserve only human speech remove these "desired noises." Alternatively, if noise reduction algorithms are eliminated, unwanted noises (e.g., computer fan noise) may not be removed from an online video conference.

BRIEF DESCRIPTION OF THE DRAWINGS

FIG. 1 is a block diagram of an online conference environment in which noises may be managed, according to an example embodiment.

FIGS. 7A and 7B are diagrams illustrating noise-reduced audio, with the audio of FIG. 7A being processed with conventional noise reduction techniques and the audio of FIG. 7B being processed with the techniques presented herein.

FIG. 11 is a diagram illustrating a user interface that allows user configuration of the additional noise reduction techniques of FIG. 9.

DESCRIPTION OF EXAMPLE EMBODIMENTS

Overview

Figure 3:
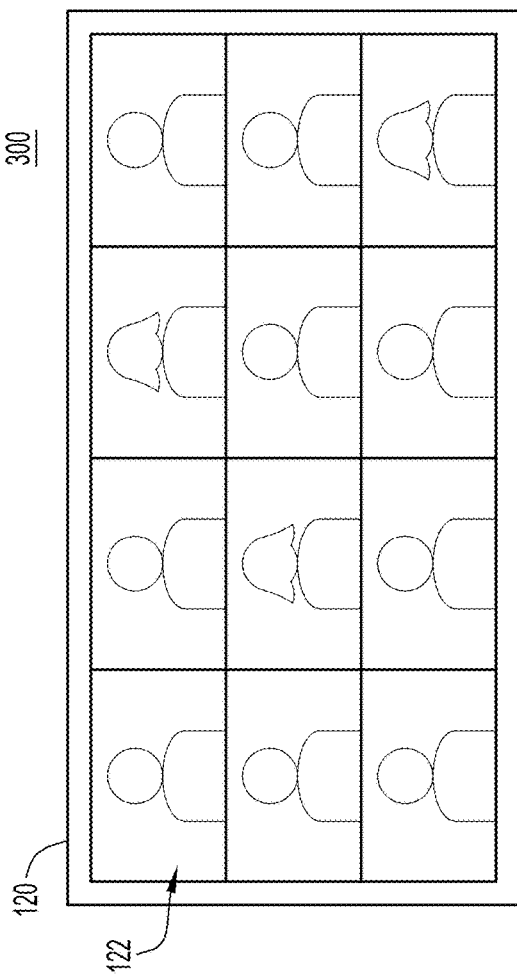
FIGS. 2 and 3 are diagrams illustrating online conference sessions for which the techniques presented herein may be implemented.

Techniques are provided herein for managing noise during an online conference session. These techniques may be embodied as one or more methods, one or more apparatuses, one or more systems, and instructions in a computer-readable storage media to perform the one or more methods.

According to at least one example embodiment, techniques are provided for managing noise during an online conference session. The techniques include obtaining audio data from an endpoint participating in an online conference session. The audio data is derived from audio captured at the endpoint that includes musical sounds. The audio data is processed to identify a portion of the audio data in which a decibel level of the musical sounds is stable for a period of time. If non-musical noise is present in the audio data with the musical sounds, the non-musical noise is identified and attenuated from the audio data to generate noise-reduced musical audio data. The noise-reduced musical audio data is transmitted for play out at one or more other endpoints participating in the online conference session.

Example Embodiments

The techniques presented herein provide noise management for online conference sessions. The techniques enable sounds that are typically filtered or reduced during an online conference session to be transmitted between endpoints during an online conference session while unwanted noise is still attenuated from captured audio. More specifically, the techniques presented herein provide noise reduction for music that enables music to be processed for noise reduction without reducing the quality of the music (e.g., without disabling noise reduction). Additionally, the techniques presented herein may provide automatic, selective noise attenuation that selectively activates noise reduction for only certain noises (or selectively skips noise reduction for specific noises).

By comparison, many conventional noise reduction algorithms are designed to preserve only human speech and, thus, may remove music or other noises that, in some instances, should be captured during an online conference session (e.g., a non-business online conference session, such as a virtual music lesson, a virtual boxing training session, a virtual happy hour, etc.). For example, some endpoints dedicated to video conferencing can reduce up to eighteen decibels of noise, but the noise reduction works for speech and will also degrade music (e.g., by removing long tones that is interpreted as stationary noise).

Additionally, if music is sent through a microphone signal processing path, automatic gain control (AGC) may eliminate dynamics in the music. (For speech, AGC secures a speech level that is close to the target level independent of the distance from the microphone). Accordingly, some online conference solutions provide modes that allow a user to disable noise reduction and AGC. However, this may have detrimental effects during a video conference. For example, background noise during a music performance, such as fan noise from an endpoint, may not be filtered out. Additionally, such solutions typically require each user to manually enable/disable audio features (e.g., noise reduction and/or AGC) at an endpoint at the right time, which can be problematic to coordinate and/or implement.

Reference is first made to FIG. 1, which illustrates an online conference/meeting environment 100 in which an online conference session may utilize the noise management techniques presented herein. In the environment 100, an online conference server 102 (i.e., meeting server 102) communicates, via the Internet 110, with a plurality of endpoints 120. For simplicity, only two endpoints 120 are shown in FIG. 1; however, in other embodiments, the plurality of endpoints 120 may include any number of endpoints/computing devices.

The online conference server 102 includes at least one processor 104, a network interface unit 106, and a memory 108. The processor 104 is configured to execute instructions stored on memory 108 and the network interface unit 106 enables connectivity to the Internet 110. The online conference server 102 also includes a server application 160 that may reside in memory 108 and serves conference session support for online conference client applications 170 (also referred to herein as client applications 170, for simplicity) that may be installed on the plurality of endpoints 120 (e.g., downloaded via the Internet 110). Generally, the server application 160 is configured to direct online conference traffic flows between any online conference client applications 170 participating in an online conference session. Thus, once an online conference session is initiated, each client application 170 is operatively connected to the server application 160 such that any client applications 170 connected to the session are in communication with each other in an online conference session via the server application 160. The session may be established using any suitable protocols now known or hereinafter developed.

The server application 160 may include a server noise management module 162 that is configured to receive and process audio captured at any of the endpoints 120 (e.g., via one or more microphone at each endpoint 120). For example, the server noise management module 162 may attenuate noise from musical audio (i.e., music) captured at one of endpoints 120 to generate noise-reduced musical audio that can be transmitted to any other endpoints 120 participating in an online conference session. Additionally or alternatively, the noise management techniques presented herein may be executed on one or more of the endpoints 120 participating in a conference session. Thus, in FIG. 1, client noise management module 172 is shown in dashed lines within memory 156 of each of the plurality of endpoints 120. To be clear, client noise management module 172 may work with or instead of server noise management module 162 to execute the techniques presented herein.

Each of the plurality of endpoints 120 includes a processor 152 configured to execute instructions stored in a memory 156 and a network interface unit 154 that provides connectivity to the Internet 110. For example, the processor 152 may be configured to execute instructions to install the client application 170 (and potentially client noise management module 172). Generally, each of the plurality of endpoints 120 may be any computing device/endpoint compatible to support the online conference client application 170. For example, one endpoint 120 may be a tablet computer, desktop computer, laptop computer, and another endpoint 120 may be a smartphone, desktop, virtual machine, or any other device, provided that each of the plurality of endpoints includes or is associated with a processor 152 configured to support the online conference client application 170 and network interface unit 154 configured to connect the device to the Internet 110. Additionally or alternatively, one or more of the endpoints 120 may be embodied entirely as one or more software applications running on a computing device, such as in a cloud or data center environment. Thus, an endpoint 120 may be a physical device or a software process. As a specific example of a physical device, a computing device is described in detail below in connection with FIG. 12.

Additionally, although each module described herein is shown stored in memory, such as memory 108, each module described herein may be implemented on hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based-processing by the module that is initiated directly or indirectly by the processor to complete a process or obtain a result. Additionally or alternatively, each module can include memory hardware, such as at least a portion of a memory, for example, that includes instructions executable with a processor to implement one or more of the features of the module. When any one of the modules includes instructions stored in memory and executable by the processor, the module may or may not include a processor. In some examples, each module may include only memory storing instructions executable with the processor to implement the features of the corresponding module without the module including any other hardware.

Moreover, memory 108 and/or memory 156 may also be configured to store any messages, flags, or other data related to noise management during an online conference session. Generally, memory 108 and/or memory 156 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 108 and/or memory 156 may be or include one or more tangible (non-transitory) computer readable storage media (e.g., a memory device) encoded with software comprising computer executable instructions. For example, memory 108 and/or memory 156 may store instructions that may be executed by processor 104 or processor 152, respectively, for performing noise management techniques described below with reference to the figures. In other words, memory 108 and/or memory 156 may include instructions, that when executed by one or more processors, cause the one or more processors to carry out the operations described below in connection with the figures.

Figure 2:
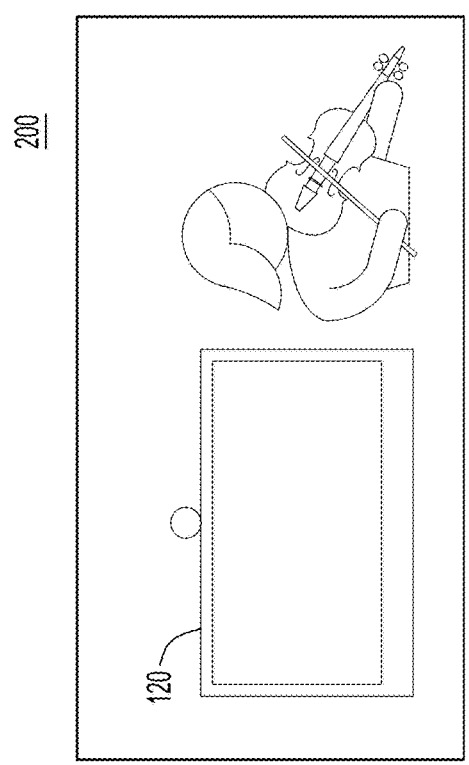

Now turning to FIGS. 2 and 3, these Figures depict two example use cases in which the techniques presented herein might be utilized. First, in FIG. 2, diagram 200 shows a user playing violin in front of endpoint 120 during an online conference session. In this scenario, the user may be receiving a music lesson or playing as part of an ensemble. Either way, it may be desirable that music played by the user be transmitted to other users participating in the online conference session (e.g., at other endpoints) without distortion, signal reduction, etc. That is, it may be desired that music played by the user be transmitted to other user's participating in the online conference session with high audio quality and without degradation that may be caused by conventional audio signal processing. However, at the same time, if there is noise in the user's environment, such as fan noise from the endpoint 120 or background noise in the user's house, this noise may negatively impact the music lesson or ensemble (or any other scenario) just as much as degradation that may be caused by audio signal processing. Meanwhile, in FIG. 3, diagram 300 illustrates a user interface 122 presented on an endpoint during a virtual happy hour. In this scenario, drink clinking noises and music may be desired, but other background noises may be undesirable or unwanted.

Figure 4:
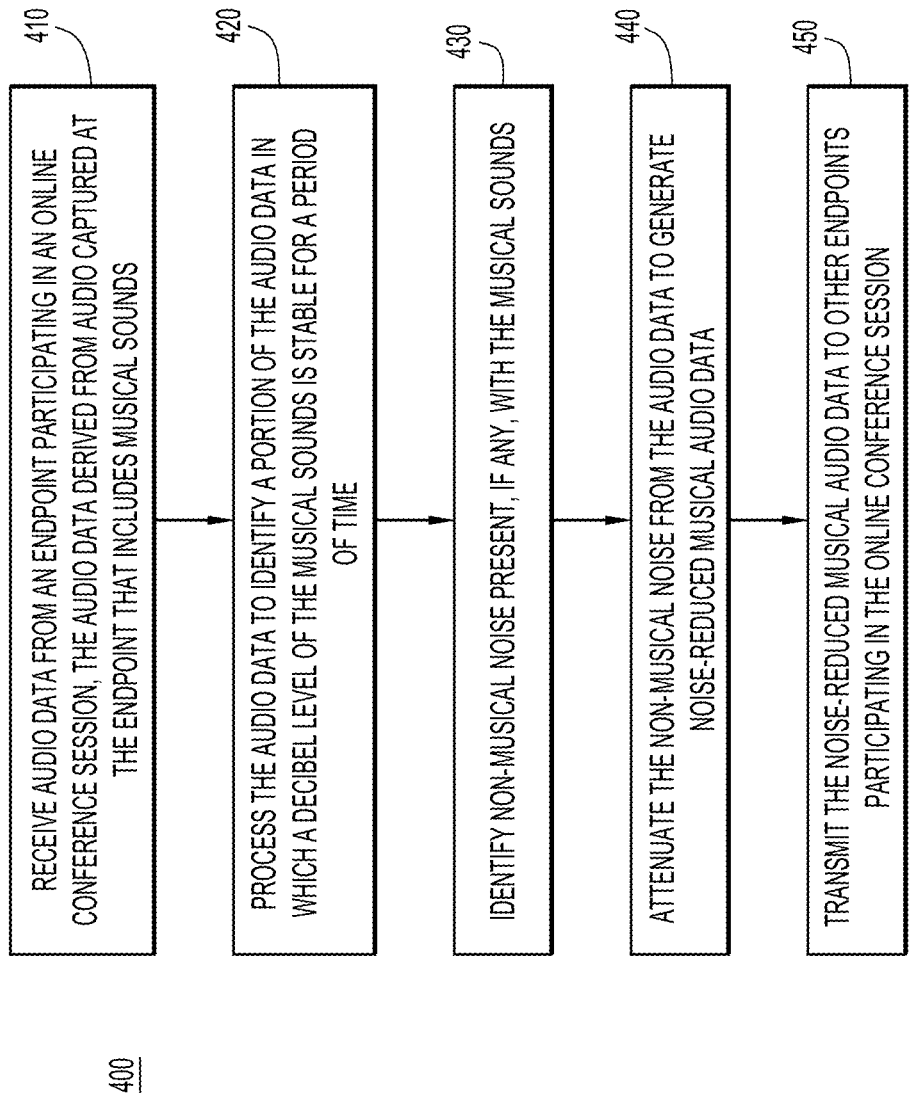
FIG. 4 is a high-level flowchart illustrating a method for managing noise at a server application during an online conference session, according to an example embodiment.

Reference is now made to FIG. 4, with continued reference to FIG. 1, for a high-level description of a method 400 for managing noise during an online conference session. For simplicity, method 400 is described herein as being performed by a server or server application 160, such as via execution of the software instructions included in server noise management module 162. However, this is just an example and in other embodiments, the techniques presented herein may be executed at any computing device participating in an online conference session. In fact, FIG. 8, described below, depicts a method 800 for managing noise during an online conference session that is executed at an endpoint 120.

In method 400, a server initially receives, at 410, audio data from an endpoint participating in an online conference session. The audio data is derived from audio captured at the endpoint and includes musical sounds (music audio). For example, the musical sounds may be singing by a person or persons, music played on an instrument (e.g., as shown in FIG. 2), and/or music output by a speaker of or near an endpoint (e.g., during a virtual happy hour, as shown in FIG. 3). At 420, the server processes the audio data to identify a portion of the audio data in which a decibel level of the musical sounds is stable for a period of time. An example of this processing is discussed in further detail below in connection with FIG. 5.

After a portion of the audio is determined to be stable for a period of time at 420, the server may identify, at 430, any non-musical noise present with the musical sounds (music audio). At a high-level, this may involve estimating noise included in audio data based on the portion of the audio data with a stable decibel level. In at least some embodiments, the audio data may be split into frequency sub-bands prior to this step and, thus, any noise estimates may be performed on a per frequency sub-band basis. An example of estimating noise on a per frequency sub-band basis is discussed in detail below in connection with FIG. 6.

Once the server identifies non-musical noise in the audio data at 430, the server may attenuate the non-musical noise from at least portions of the audio data where the musical sounds are present at 440. In some embodiments, non-musical noise is only attenuated when present with musical sounds. Alternatively, non-musical noise may be attenuated from any audio data, such as when an online conference session participant is talking and when the participant is playing an instrument. Regardless, in either scenario, the identification need not be precise and in at least some embodiments, identifying non-musical noise may comprise estimating the presence of non-musical noise. Moreover, in at least some embodiments, not all non-musical noise is attenuated (i.e., reduced or removed). For example, if certain sounds have been whitelisted, these sounds may not be attenuated in/from the audio data. Examples of each of these scenarios are described in detail below.

Figure 5:
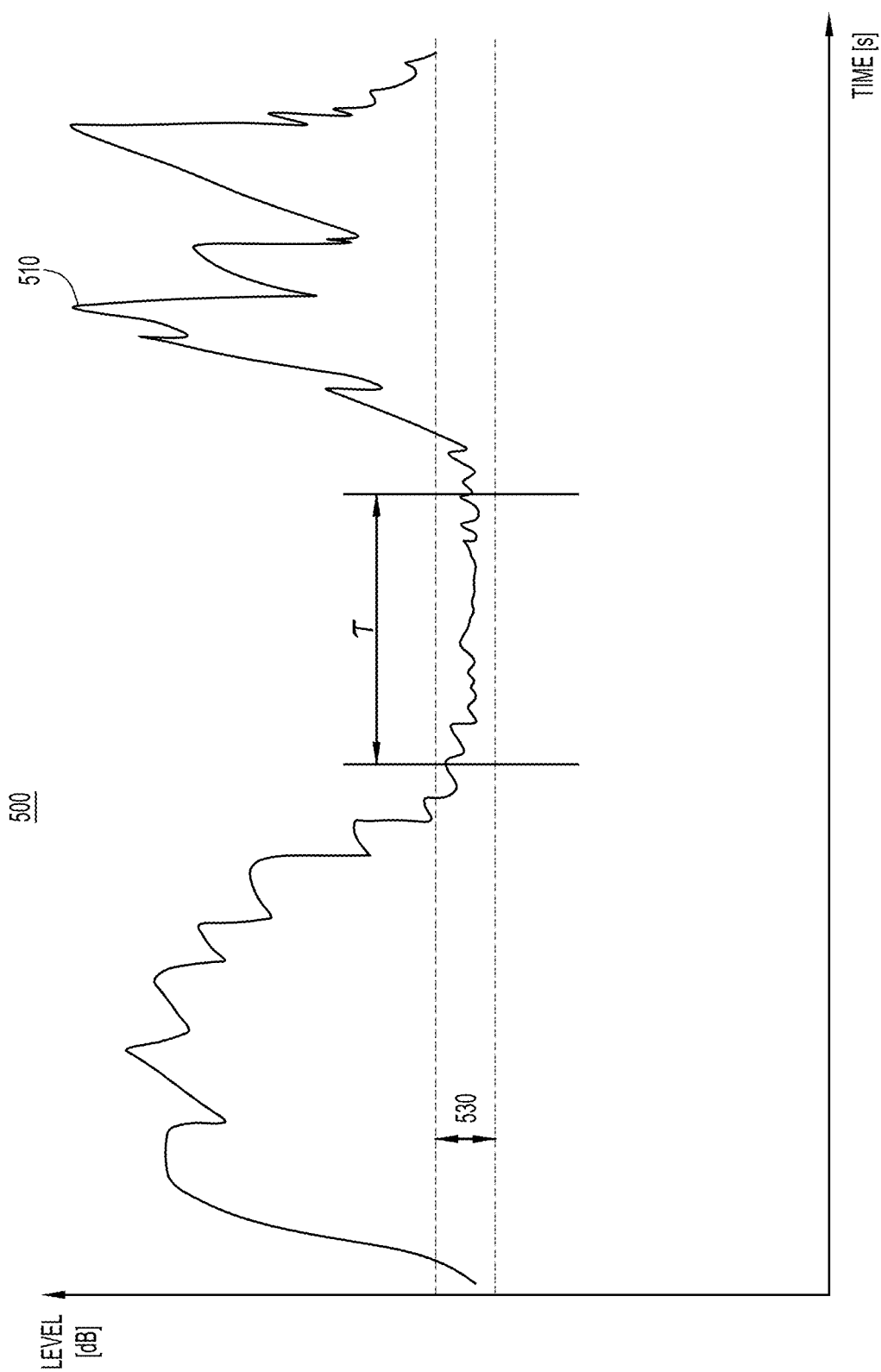
FIG. 5 is a plot illustrating noise detection techniques presented herein, according to an example embodiment.

Now turning to FIG. 5, which illustrates, in diagram 500, operations performed in step 420 of the method 400 depicted in FIG. 4. The server may process audio 510 (represented in diagram 500 as audio signal 510) by comparing the audio to a predetermined range 530. If the audio 510 remains within the range 530 for an elongated period of time T, it may be considered stable. However, the audio 510 need not be within a specific decibel range to be considered stable. Instead, the range 530 may be a "floating range" such that the range 530 can be used to measure a change in decibel level instead of a magnitude of the decibel level. Put another way, range 530 may be a specific "delta" that is predetermined or set dynamically in any manner now known or developed hereafter.

Regardless of the specific delta size, the period of time T may be elongated as compared to evaluation time periods used to identify noise during speech. For example, for speech, conventional noise reduction techniques may consider audio to be stable when it remains within a predetermined range for 300 milliseconds. Here, the period of time may be longer than a second, such as three seconds, ten seconds, or longer. A period of time T of ten seconds has been found to be particularly accurate. Notably, with a longer period of time T, long tones in musical sounds may be considered stable. By comparison, in noise reduction techniques used for speech, long tones in music may be considered noise when evaluated based on a baseline established during a very short period of time (e.g., under one second).

Figure 6:
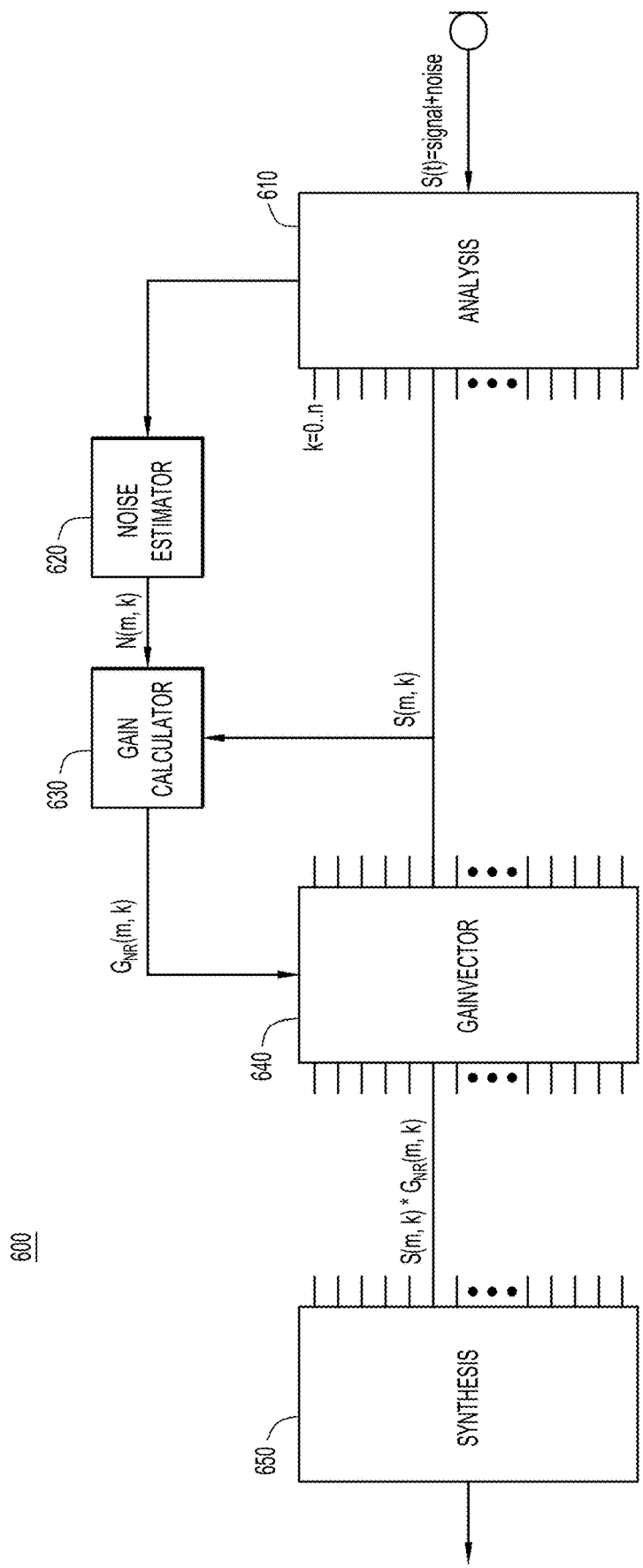
FIG. 6 is a block diagram illustrating a noise reduction system that may be utilized by the techniques presented herein, according to an example embodiment.

FIG. 6 illustrates an example noise reduction system 600 that may be included in or leveraged by server noise management module 162 and/or client noise management module 172 to estimate noise on a per frequency sub-band basis. Initially, audio data may be fed into a filter bank 610 to divide the audio into frequency sub-bands. For example, an audio signal S(t), which may include speech, musical sounds, and/or noise at different times, may be fed into filter bank 610 to produce n+1 signals with an index k=0-n for each frame m. In some examples, the filter bank 610 may be a Short-Time-Fourier-Transform (STFT), but in other embodiments, the filter bank 610 can be any type of filter bank, including more sophisticated filter banks with improved side-band attenuation. Each frequency sub-band (e.g., signals n+1) is then processed by a noise estimator 620 to estimate noise for each frequency sub-band.

More specifically, noise for each frequency sub-band (i.e., "N(m, k)") may be estimated based on the portion of the audio data with a stable decibel level. As an example, when the signal level, |S(m, k)|, is stable for a certain amount of time T, a flag may be set (e.g., isnoise=1). When this flag is set (e.g., when isnoise=1), the server can update the noise estimate with this formula: N(m, k)=N(m, k)*tc+S(m, k)*(1−tc), where "tc" is a constant between 0.0 and 1.0. As mentioned, T may be significantly longer than when used for speech (e.g., T may be 10 seconds). Thus, noise reduction system 600 will recognize musical sounds as part of the online conference session, but still may be able to reduce or remove other noise present in the room, especially stationary noise, such as a constant whir from a fan that is present before and after a long tone. In addition or as an alternative to extended time period T, the aforementioned formula could be adjusted to update slower by increasing the time constant tc to higher values (e.g., closer to 1).

Still referring to FIG. 6, but now in combination with FIG. 4, at a high-level, attenuating non-musical noise at 440 may involve calculating gain based on a noise estimate and applying the calculated gain to original audio data (e.g., noisy audio data) to reduce noise in the audio data. For example, as is shown in FIG. 6, in at least some embodiments, a gain calculator 630 may process each frequency sub-band (e.g., signals n+1) to calculate gain for each frequency sub-band. Gain ($G_{NR}$) may be calculated by determining a percentage of a frequency sub-band signal attributable to noise, such as by using the following formula: $G_{NR}$=(S(m, k)–γN(m, k))/S(m,k), where γ represents a constant that allows for overestimation of noise (e.g., to artificially inflate a noise estimate to try to ensure that all noise is attenuated). Once the gain is calculated, the gain may be applied to audio data in each frequency sub-band at gain vector module 640 (e.g., the original, noisy signal) to reduce or attenuate the gain. Put another way, a noise-attenuated signal S'(m, k) may be generated at gain vector module 640 by multiplying the original audio data of each frequency sub-band S(m, k) by the calculated gain $G_{NR}$(m, k). Then, the noise reduction system 600 (perhaps run by the server) may combine the frequency sub-bands at a synthesis block 650 (of FIG. 6) to produce noise-reduced musical audio that the server may transmit data to other endpoints participating in the online conference session at 450 (of method 400 shown in FIG. 4).

Now turning to FIGS. 7A and 7B, with the techniques described herein, noise can be attenuated both when a participant is talking and when the participant is playing music. However, importantly, noise reduction will not reduce the sound quality of the music, which is typically significantly suppressed with conventional noise reduction techniques. In fact, this is why some conventional solutions suggest or allow deactivation of noise reduction techniques (and perhaps AGC processing as well) during musical online conference sessions. As an example, FIG. 7A is a diagram 700 that illustrates audio with musical sounds that has been processed with conventional noise reduction techniques, such as noise reduction techniques for speech with shorter or reduced noise evaluation periods (e.g., shortened as compared to time period T). Meanwhile, FIG. 7B is a diagram 750 that illustrates the same audio while processed with the techniques presented herein. As can be seen, during a start-up period 702, the audio in both diagrams is quite similar. However, as is demarcated by inflection point 704, noise reduction techniques begin to modify the audio after a few seconds, which drastically reduces the audio in diagram 700 and destroys the quality of any music included in the audio. By comparison, after 704, the audio in diagram 750 remains strong and the true signal levels are maintained, providing high-quality musical audio.

Still referring to FIGS. 7A and 7B, in at least some instances, the noise reduction techniques presented herein may be coupled with a deactivation of AGC. As mentioned, AGC can sometimes detrimentally effect musical sounds and, thus, de-activating AGC while reducing noise with the techniques presented herein may preserve audio of the highest quality. In FIG. 7B, the AGC was turned off and, thus, the audio in diagram 750 maybe being a bit stronger as compared to the audio in diagram 700. However, the difference in audio strength/quality after 704 between diagrams 700 and 750 is primarily caused by different noise reduction techniques applied to the audio. Additionally or alternatively, an acoustic echo canceller may remain on when the techniques presented herein are executed, which may help reduce unwanted noise in the audio in diagram 750. By comparison, techniques that deactivate or turn off audio processing to capture and transmit music during an online conference session will not receive the benefits of acoustic echo cancelling.

Figure 8:
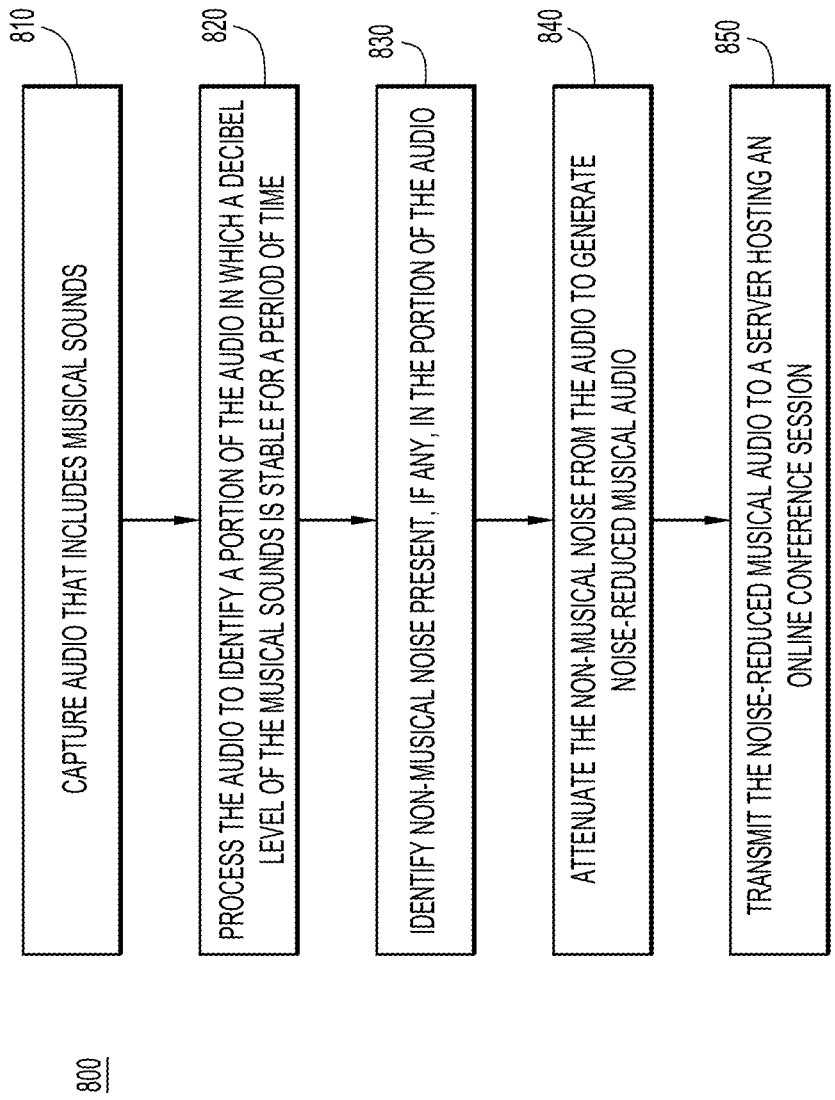
FIG. 8 is a high-level flowchart illustrating a method for managing noise at a client application during an online conference session, according to an example embodiment.

Now turning to FIG. 8 for a high-level description of another method 800 for managing noise during an online conference session. As mentioned, the techniques presented herein need not be implemented exclusively at a server and, instead, can be implemented, either entirely or partially, at an endpoint participating in an online conference session. Thus, method 800 illustrates a method that may be executed at an endpoint. However, this is merely an example and it should be understood that portions of method 800 could be executed in combination with portions of method 400 (e.g., to identify noise at an endpoint and attenuate noise at the server or in any other distributed manner).

In method 800, initially, at 810, the endpoint captures audio that includes musical sounds. For example, the endpoint may include a microphone array and may capture audio via the microphone array. At 820, the endpoint may process the audio to identify a portion of the audio in which a decibel level of the musical sounds is stable for a period of time. At 830, the endpoint may identify non-musical noise present, if any, with the musical sounds, and at 840, the endpoint may attenuate the non-musical noise from the audio to generate noise-reduced musical audio. More specifically, the endpoint may execute the operations discussed above in connection with steps 420, 430, and 440 of FIG. 4, respectively, which, for brevity, are not repeated here. Finally, at 850, the endpoint may transmit the noise-reduced musical audio to a server hosting an online conference session so that the server can transmit the noise-reduced musical audio to any other endpoints participating in the online conference session.

Figure 9:
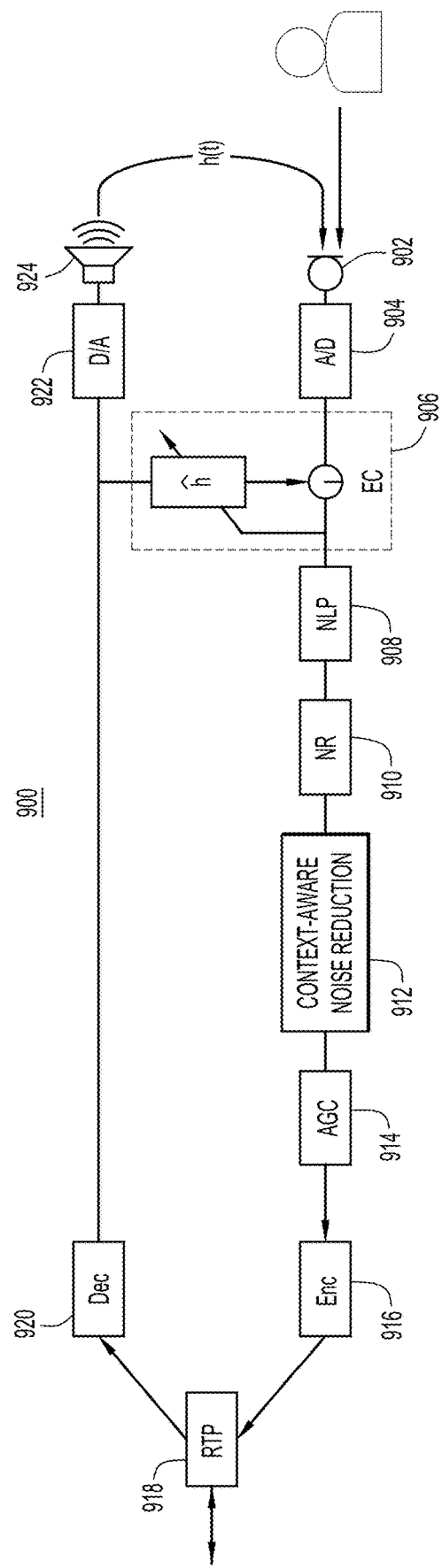
FIG. 9 is a block diagram illustrating an audio processing system that may implement the techniques presented herein in combination with additional noise reduction techniques, according to an example embodiment.

Reference is now made to FIG. 9. FIG. 9 illustrates a block diagram of an audio processing system 900 that may implement the techniques presented herein, according to an example embodiment. In order to show a complete processing loop, the audio processing system 900 includes components that are included at a server and one or more endpoints; however, this is only for simplicity and should not be understood to limit the techniques presented herein to any specific architecture or implementation. To initially receive audio, an endpoint in audio processing system 900 may include a microphone 902 that captures audio. This audio is passed to an analog to digital (A/D) converter 904, an echo canceller (EC) 906, and a non-linear processor (NLP) 908.

The NLP 908 performs residual echo masking that may remove parts of an acoustic echo that remain present after processing by the EC 906, including ducking effects that are sometimes caused by double-talk. As mentioned above, the EC 906 may remain on during execution of the techniques presented herein, providing further noise removal and rendering the techniques presented herein yet more advantageous. Additionally or alternatively, the NLP 908 might be turned off or set to a reduced mode when music is detected (as discussed below) to improve ducking effects for the musical audio (e.g., by not lowering or only delicately lowering one musical audio signal in the presence of another audio signal). This could be coupled with (or replaced by) user interface microphone controls that allow for at least some level of sound mixing. In at least some embodiments, the A/D converter 904, the EC 906, and the NLP 908 are included/executed on an endpoint device, but in other embodiments at least some of these components are included on a server.

After processing by the NLP 908, the noise reduction techniques presented herein can be applied to the audio data at noise reduction (NR) module 910. Thus, NR module 910 may attenuate stationary noise (e.g., based on an elongated noise evaluation period) from musical audio. Additionally, these techniques may be cascaded in the same pipeline with additional noise reduction techniques that aim to attenuate or at least identify non-stationary noise. In the depicted embodiment, the additional noise reduction techniques are depicted after NR module 910 as context-aware noise reduction module 912; however, this arrangement could also be reversed to apply context-aware noise reduction module 912 prior to NR module 910. Alternatively, context-aware noise reduction module 912 and NR module 910 could operate in a combined or collaborative manner.

Context-aware noise reduction 912 is discussed in further detail below, but after noise reduction by NR module 910 and/or context-aware noise reduction module 912, audio data may pass to automatic gain control 914 (optionally), and an encoder 916 (e.g., to reduce bitrate via compression). Then, the audio may be transmitted via a real-time protocol (RTP) processor 918 or any other protocol processor for transmission of audio and video packets in a real time communication system before it is received and then decoded by decoder 920, converted to an analog signal by a digital-to-analog (D/A) converter 922 and played out at a speaker 924.

Figure 10A:
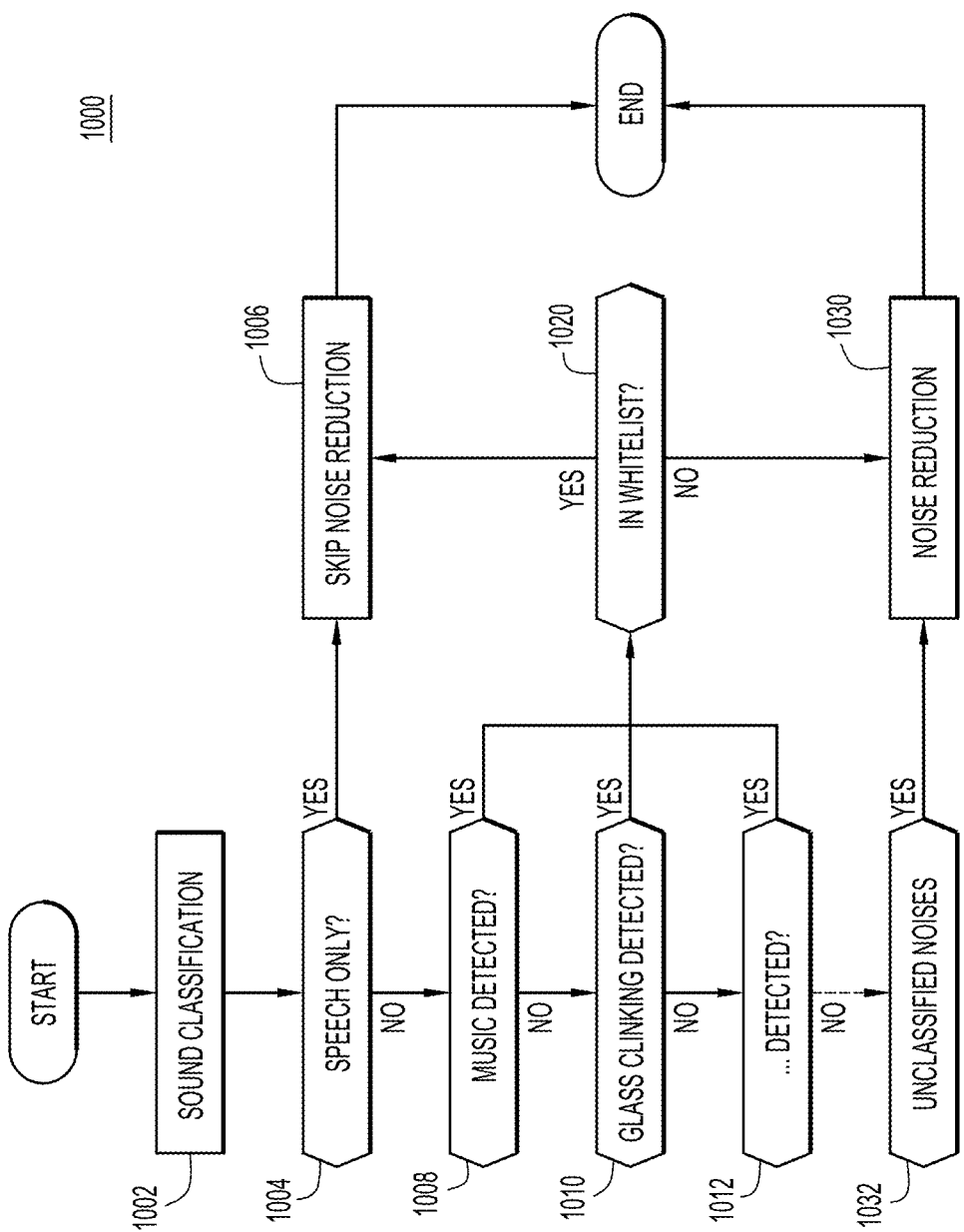
FIG. 10A is a high-level flowchart depicting operations of the additional noise reduction techniques of FIG. 9, according to an example embodiment.
Figure 10B:
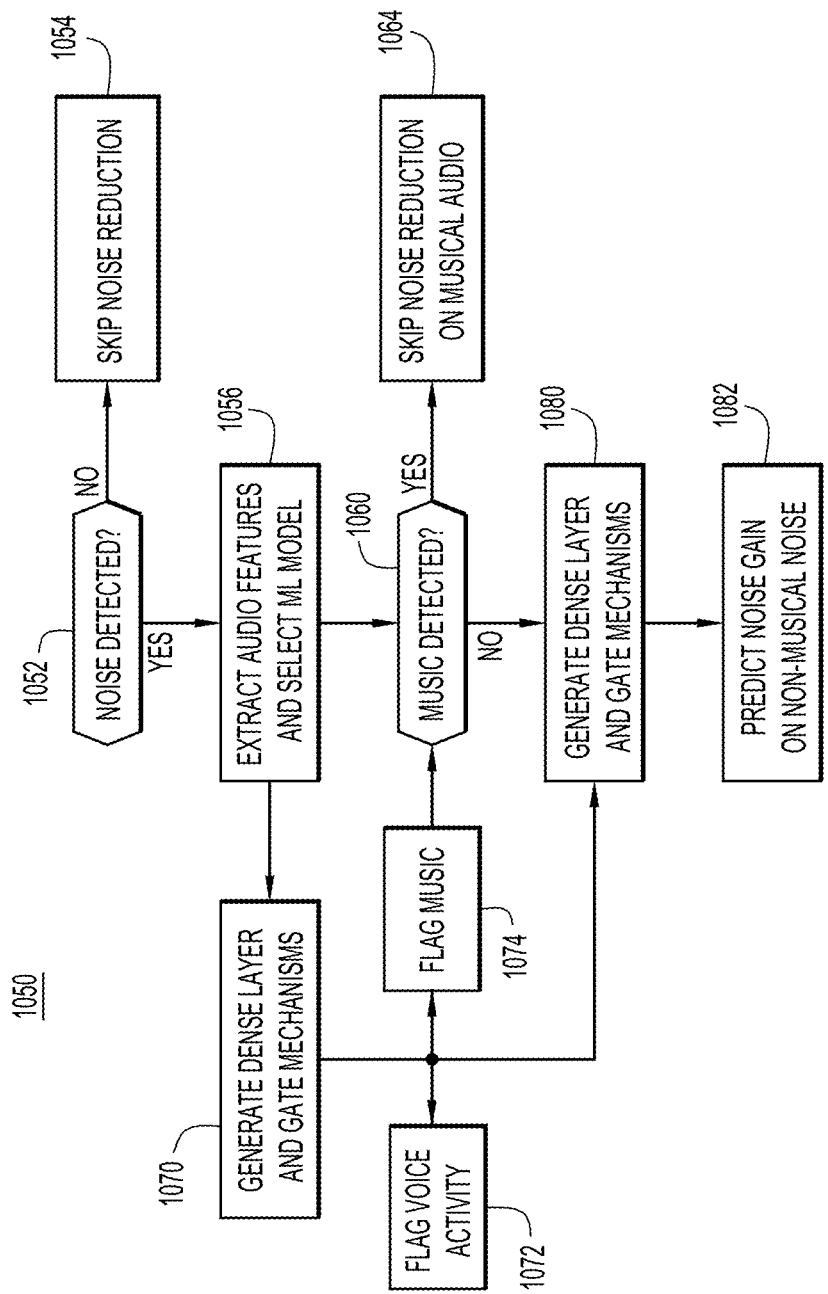
FIG. 10B is a flowchart depicting interaction between the noise management techniques and the additional noise reduction techniques of FIG. 9, according to an example embodiment.

Reference is now made to FIGS. 10A and 10B, with continued reference to FIG. 9. FIGS. 10A and 10B illustrate methods of implementing the techniques presented herein in combination with context-aware noise reduction (e.g., as provided at 912). Among other advantages, the context-aware noise reduction (or at least portions thereof) may start, stop, or re-start the noise management techniques described herein in connection with FIGS. 4-8 so that, for example, the techniques are only implemented when music is detected during an online conference session. That is, the context-aware noise reduction may provide automatic mode switching. This may save valuable computing resources during the online conference session (e.g., by drastically reducing processing at the server). Moreover, the context-aware noise reduction may supplement the techniques described herein (e.g., in connection with FIGS. 4-8) to enhance the non-musical noise reduction, such as by ensuring that unwanted and/or additional noises are attenuated from music, by allowing certain non-musical noise to not be attenuated from music, and/or by attenuating noise when music is not present in the audio. In fact, regardless of the scenario, the context-aware noise reduction may attenuate noise that might not be detected when compared to an elongated baseline (e.g., additional, "non-stationary" noise).

First, FIG. 10A illustrates a high-level method 1000 for operations of a context-aware noise reduction, such as performed by module 912 in FIG. 9. Initially, at 1002, sounds are classified with a multi-class machine learning model, such as within the architecture of a recurrent neural network, which is described in further detail below in connection with FIG. 10B. This model identifies a number of different sounds, such as music, dog barking, glass clinking, etc., that a user might decide to whitelist during an online conference session. In the depicted embodiment, if the machine-learning model determines, at 1004, that the audio includes only speech (e.g., a person talking), noise reduction is skipped at 1006. However, method 1000 is only an example and in other embodiments, detection of speech-only audio may trigger conventional noise reduction techniques or the musical noise reduction techniques described herein. If, instead, a specific noise is detected at 1008, 1010, or 1012 (e.g., music, glass clinking, dog baring, etc.), the noise may be compared to a whitelist at 1020 to determine if the noise should be attenuated with noise reduction techniques.

Noise reduction techniques will not be applied to whitelisted noises at 1006 and will be applied to noises that are not on a whitelist at 1030. Thus, if a user indicates that glass clinking noises are whitelisted, these noises will not be attenuated. If noises are not identified at 1004, 1008, 1010, or 1012, the noises will be considered unclassified or unknown at 1032 and will be processed for noise reduction at 1030. Generally, the noise reduction techniques applied at 1030 may be similar to conventional noise reduction techniques and, thus, may utilize a shorter evaluation period, at least shorter as compared to time period T referred to in connection with FIG. 5. Moreover, if music is not whitelisted, the noise reduction techniques presented herein need not be utilized to reduce or remove music detected in the audio and, instead, conventional techniques may be used to attenuate the music. The musical noise reduction techniques presented herein remove noise from music, but do not remove music from other audio.

Still further, since the context-aware noise reduction module 912 is included on the same pipeline as noise reduction module 910, when music is whitelisted, noise will still be attenuated from the music at noise reduction module 910 and then the music will not be further processed for noise reduction at context-aware noise reduction 912. However, if noise remains in the musical audio after noise reduction at module 910, context-aware noise reduction module 912 might then attenuate this additional noise. As an example, if noise reduction module 910 attenuates stationary/constant noise (e.g., computer fan noise) from music, but not dog barking, context-aware noise reduction module 912 might further process the music to remove or reduce the dog barking (or any other non-whitelisted noise). However, since the context-aware noise reduction module 912 only runs noise reduction (at 1030) in response to detection of an unclassified or non-whitelisted noise, context-aware noise reduction 912 is only selectively activated. That is, context-aware noise reduction module 912 may only activate noise reduction (at 1030) as needed. Thus, context-aware noise reduction module 912 may save valuable computing resources during the online conference session (e.g., by drastically reducing processing at the server), even when noise is being attenuated from music at noise reduction module 910.

Alternatively, if context-aware noise reduction module 912 runs in an intertwined or collaborative manner with noise reduction module 910, context-aware noise reduction 912 might selectively activate noise reduction module 910 so that noise reduction module 910 only reduces noise (e.g., stationary noise) when music is detected. In some embodiments, context-aware noise reduction module 912 selectively activates noise reduction module 910 automatically. However, in other embodiments, context-aware noise reduction module 912 can generate a prompt when music is detected to ask a user if noise reduction module 910 should be activated to remove noise from the music. For example, a user might be asked if they want to activate a "music mode." The user may also be presented with options in this prompt, such as whether to enter a broadcasting mode that mutes far end endpoints and/or turns off the speaker at the near end endpoint (to completely eliminate echo), a dynamic broadcast mode that will selectively activate broadcast mode when music is detected, or any other number of modes that might help capture optimal sound quality for music. The broadcast mode may be useful for a virtual concert that will not be interrupted while the dynamic broadcast mode may be useful for an online conference session that switches between performances and two-way conversations. In the dynamic broadcast mode, the near end endpoint's speaker may be turned on and/or far end microphones may be unmuted when music is no longer detected.

Turning to FIG. 10B, a method 1050 is depicted that may be implemented by a neural network for context-aware noise reduction module 912 of FIG. 9. Method 1050 is largely similar to method 1000 of FIG. 10A, but is presented in the context of the architecture of a recurrent neural network for noise reduction, voice activity detection, and music detection. Initially, at 1052, the recurrent neural network attempts to detect noise. If no noise is detected at 1052, noise reduction is skipped at 1054. If, instead, noise is detected at 1052, audio features and a machine-learning model are selected. If the audio features are immediately determined to be music, the recurrent neural network may determine as much at 1060 and skip noise reduction for the musical audio (i.e., music) at 1064 (since the musical audio/music will be noise reduced with the techniques described herein, e.g., in connection with FIGS. 4-8). Otherwise, the recurrent neural network may begin to generate dense layers and gate mechanisms at 1070, such as gated recurrent units (GRUs), that can filter the noise and flag voice activity or music at 1072 and 1074, respectively (among other types of flags). In at least some embodiments, specific non-musical noise flags may trigger operations 1004, 1008, 1010, and 1012 of FIG. 10A. Additionally or alternatively, the recurrent neural network may continue processing the audio by generating additional dense layers and gate mechanisms at 1080 to predict noise gain on non-musical noise at 1082.

Now turning to FIG. 11, this figure illustrates an example user interface 1100 that allows a host or participant to configure a whitelist of different types of noise. User interface 1100 includes an audio processing selection area 1110 that allows a user to select noise that should be captured (not noise-reduced) during an online conference session. Thus, at the beginning of an online conference session, a user (e.g., a host or participant) can select different types of noise that should be whitelisted and transmitted to participants during the conference session. However, notably, since the noise reduction is automatically, selectively activated, the user may not need to return to interface 1100 during the conference session. For example, if the user is having a virtual happy hour with friends, he or she may whitelist glass clinking and music at the start of the virtual happy hour. Then, if the virtual happy hour transitions from drinks to music, the noise reduction will adjust automatically, selectively applying the techniques described in connection with FIGS. 4-8 for detected music while selectively activing more conventional noise reduction techniques for glass clinking when needed. The automatic activation of selective noise reduction may lessen the chance of a human error inadvertently degrading audio quality, for example, if one or more users accidentally leaves noise reduction turned on or off at the wrong time.

However, to be clear, user interface 1100 is merely an example and a user interface compatible with the techniques presented might also present additional options. For example, a user interface may allow a user to control AGC and/or echo cancelling and/or select a specific mode (e.g., broadcasting or dynamic broadcasting mode) and options associated therewith (e.g., whether to turn off near end speakers, mute far end microphones, or both during one of the broadcasting modes). Still further, in some embodiments, the user interface may enable a user to control, at least to some degree, sound mixing between endpoints (e.g., for a virtual ensemble). For example, the user interface could allow a user to make adjustments to microphone volumes across endpoints participating in an online conference session, mix levels from different sources, including microphones, Universal Serial Bus (USB) inputs, and High-Definition Media Interface (HDMI) inputs, and control certain sound effects like reverberation, echo, and auto-tune in a similar manner how these effects are controlled on mixer consoles. Generally, if a user adjusts any of the foregoing via the user interface, associated components of an audio processing system (e.g., audio processing system 900) may effectuate the adjustment in any manner now known or developed hereafter.

Figure 12:
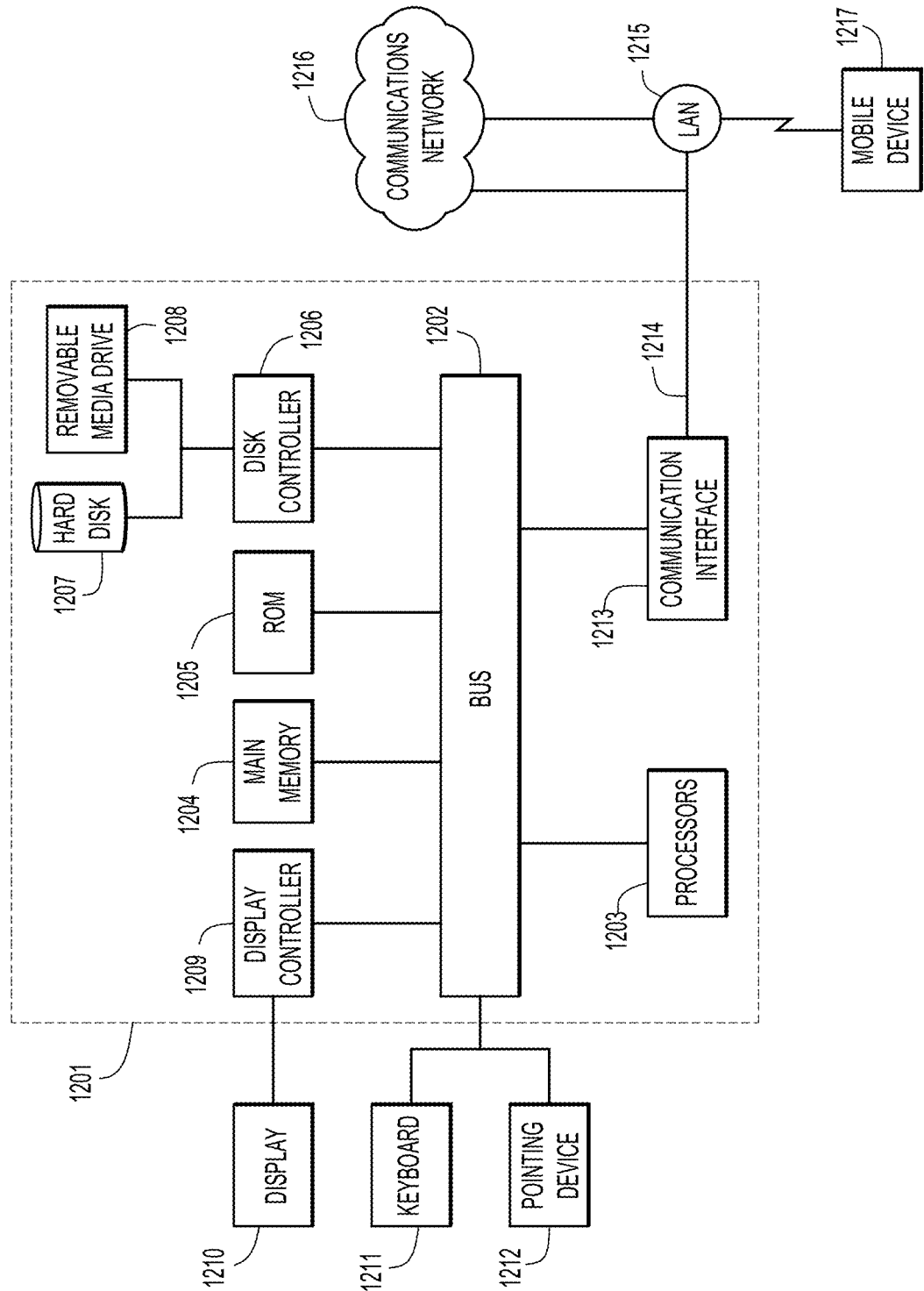
FIG. 12 illustrates a computer system upon which the embodiments presented may be implemented.

FIG. 12 illustrates a computer system 1201 upon which the embodiments presented may be implemented. The computer system 1201 may be programmed to implement a computer based device, such as a video conferencing endpoint or any device includes an audio processing system for processing real-time audio. The computer system 1201 includes a bus 1202 or other communication mechanism for communicating information, and a processor 1203 coupled with the bus 1202 for processing the information. While the figure shows a single block for processor 1203, it should be understood that the processors 1203 represent a plurality of processing cores, each of which can perform separate processing. The computer system 1201 also includes a main memory 1204 and a ROM 1205 or other static storage device (e.g., programmable ROM (PROM), erasable PROM (EPROM), and electrically erasable PROM (EEPROM)) coupled to the bus 1202 for storing static information and instructions for the processor 1203. Memory 1204 and/or ROM 1205 generally represent memory 108 and/or memory 156 of FIG. 1.

The computer system 1201 also includes a disk controller 1206 coupled to the bus 1202 to control one or more storage devices for storing information and instructions, such as a magnetic hard disk or solid state drive 1207, and a removable media drive 1208 (e.g., floppy disk drive, read-only compact disc drive, read/write compact disc drive, removable magneto-optical drive and optical storage drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA), or any other technologies now known or hereinafter developed.

The computer system 1201 may also include special purpose logic devices (e.g., ASICs) or configurable logic devices (e.g., simple programmable logic devices (SPLDs), complex programmable logic devices (CPLDs), and FPGAs), that, in addition to microprocessors and digital signal processors may individually, or collectively, are types of processing circuitry. The processing circuitry may be located in one device or distributed across multiple devices.

The computer system 1201 may also include a display controller 1209 coupled to the bus 1202 to control a display 1210, such as a Liquid Crystal Display (LCD), Light Emitting Diode (LED) display, or other now known or hereinafter developed display technologies, for displaying information to a computer user. The computer system 1201 includes input devices, such as a keyboard 1211 and a pointing device 1212, for interacting with a computer user and providing information to the processor 1203. The pointing device 1212, for example, may be a mouse, a trackball, a pointing stick or a touch-pad, for communicating direction information and command selections to the processor 1203 and for controlling cursor movement on the display 1210. The display 1210 may be a touch-screen display.

The computer system 1201 performs a portion or all of the processing steps of the process in response to the processor 1203 executing one or more sequences of one or more instructions contained in a memory, such as the main memory 1204. Such instructions may be read into the main memory 1204 from another computer readable medium, such as a hard disk or solid state drive 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1201, for driving a device or devices for implementing the process, and for enabling the computer system 1201 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a wired or wireless network interface card to attach to any packet switched (wired or wireless) LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic, or optical signals that carry digital data streams representing various types of information.

The network link 1214 typically provides data communication through one or more networks to other data devices. For example, the network link 1214 may provide a connection to another computer through a local area network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase, and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

In summary, in one form a method is presented herein, the method comprising: obtaining audio data from an endpoint participating in an online conference session, the audio data derived from audio captured at the endpoint that includes musical sounds; processing the audio data to identify a portion of the audio data in which a decibel level of the musical sounds is stable for a period of time; identifying non-musical noise present, if any, in the audio data with the musical sounds; attenuating the non-musical noise from the audio data to generate noise-reduced musical audio data; and transmitting the noise-reduced musical audio data for play out at one or more other endpoints participating in the online conference session.

In another form, an apparatus is presented herein, the apparatus comprising: a network interface unit configured to enable network connectivity; and a processor coupled to the network interface unit that: obtains audio data from an endpoint participating in an online conference session, the audio data derived from audio captured at the endpoint that includes musical sounds; processes the audio data to identify a portion of the audio data in which a decibel level of the musical sounds is stable for a period of time; identifies non-musical noise present, if any, in the audio data with the musical sounds; attenuates the non-musical noise from the audio data to generate noise-reduced musical audio data; and transmits the noise-reduced musical audio data for play out at one or more other endpoints participating in the online conference session.

In yet another form, one or more non-transitory computer readable storage media encoded with instructions are presented herein, that, when executed by a processor, cause the processor to: obtain audio data from an endpoint participating in an online conference session, the audio data derived from audio captured at the endpoint that includes musical sounds; process the audio data to identify a portion of the audio data in which a decibel level of the musical sounds is stable for a period of time; identify non-musical noise present, if any, in the audio data with the musical sounds; attenuate the non-musical noise from the audio data to generate noise-reduced musical audio data; and transmit the noise-reduced musical audio data for play out at one or more other endpoints participating in the online conference session.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the term "approximately" and terms of its family (such as "approximate," etc.) should be understood as indicating values very near to those that accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially." Additionally, terms such as "transmit" and "receive" are broadly used herein to refer to techniques for providing and obtaining data in network environments. For example, data may be provided and obtained through packets transmitted and received through a network (e.g., Internet 110 of FIG. 1), but may also be provided and obtained through data communicated via out-of-band signaling or control channels used in environment 100.

What is claimed is:

1. A method comprising:
   obtaining audio data from an endpoint participating in an online conference session, the audio data representing audio captured at the endpoint;
   providing information that causes display of a user interface that allows an online conference session participant associated with the endpoint to select a type of noise reduction to be applied to the audio data;
   obtaining an indication, from the online conference session participant via the user interface, of a user selection that a first type of noise reduction is to be applied to the audio data obtained from the endpoint;
   in response to obtaining the indication of the user selection that the first type of noise reduction is to be applied, analyzing sounds in the audio data to identify at least two classified sounds;
   identifying a first classified sound, of the at least two classified sounds, that is an allowed sound, wherein audio information, transmitted to a remote endpoint participating in the online conference session, includes the first classified sound;
   identifying a second classified sound, of the at least two classified sounds, that is not the allowed sound, wherein the second classified sound is attenuated in the audio information; and
   based on the identification of the second classified sound, providing second information that causes display of a prompt asking a user whether to change to a different type of noise reduction.

2. The method of claim 1, wherein analyzing sounds comprises using a machine-learning model to classify sounds.

3. The method of claim 2, wherein the machine-learning model utilizes a neural network.

4. The method of claim 1, further comprising:
   transmitting the audio information to the remote endpoint.

5. The method of claim 1, wherein a server application, executing on a server, provides conference session support for the online conference session, and the server application analyzes sounds in the audio data to identify the first and second classified sounds.

6. The method of claim 1, wherein a client application executing at the endpoint analyzes sounds in the audio data to identify the first and second classified sounds.

7. The method of claim 1, wherein the allowed sound is configured by the online conference session participant associated with the endpoint.

8. One or more non-transitory computer readable storage media encoded with instructions that, when executed by one or more processors, cause the one or more processors to:
   obtain audio data from an endpoint participating in an online conference session, the audio data representing audio captured at the endpoint;
   provide information that causes display of a user interface that allows an online conference session participant associated with the endpoint to select a type of noise reduction to be applied to the audio data;
   obtain an indication, from the online conference session participant via the user interface, of a user selection that a first type of noise reduction is to be applied to the audio data obtained from the endpoint;
   in response to the obtained indication, analyze sounds in the audio data to identify at least two classified sounds;
   identify a first classified sound, of the at least two classified sounds, that is an allowed sound, wherein audio information, transmitted to a remote endpoint participating in the online conference session, includes the first classified sound;
   identify a second classified sound, of the at least two classified sounds, that is not the allowed sound, wherein the second classified sound is attenuated in the audio information; and
   based on the identification of the second classified sound, provide second information that causes display of a prompt asking a user whether to change to a different type of noise reduction.

9. The one or more non-transitory computer readable storage media of claim 8, wherein sounds in the audio data are analyzed using a machine-learning model.

10. The one or more non-transitory computer readable storage media of claim 9, wherein the machine-learning model utilizes a neural network.

11. The one or more non-transitory computer readable storage media of claim 8, wherein the instructions, when executed by one or more processors, further cause the one or more processors to:
    transmit the audio information to the remote endpoint.

12. The one or more non-transitory computer readable storage media of claim 8, wherein the allowed sound is configured by the online conference session participant associated with the endpoint.

13. A system comprising:
    one or more processors; and
    one or more memories, operably coupled to at least one of the one or more processors, storing instructions that, when executed by at least one of the one or more processors, cause the system to:
obtain audio data from an endpoint participating in an online conference session, the audio data representing audio captured at the endpoint;
provide information that causes display of a user interface that allows an online conference session participant associated with the endpoint to select a type of noise reduction to be applied to the audio data;
obtain an indication, from the online conference session participant via the user interface, of a user selection that a first type of noise reduction is to be applied to the audio data obtained from the endpoint;
in response to the obtained indication, analyze sounds in the audio data to identify at least two classified sounds;
identify a first classified sound, of the at least two classified sounds, that is an allowed sound, wherein audio information, transmitted to a remote endpoint participating in the online conference session, includes the first classified sound;
identify a second classified sound, of the at least two classified sounds, that is not the allowed sound, wherein the second classified sound is attenuated in the audio information; and
based on the identification of the second classified sound, provide second information that causes display of a prompt asking a user whether to change to a different type of noise reduction.

14. The system of claim 13, wherein sounds in the audio data are analyzed using a machine-learning model.

15. The system of claim 14, wherein the machine-learning model utilizes a neural network.

16. The system of claim 13, wherein the instructions, when executed by at least one of the one or more processors, further cause the system to:
transmit the audio information to the remote endpoint.

17. The system of claim 13, wherein the allowed sound is configured by the online conference session participant associated with the endpoint.

* * * * *